April 28, 1936.  J. H. KELLER  2,039,007
REAR ENGINE MOUNTING
Filed June 6, 1934
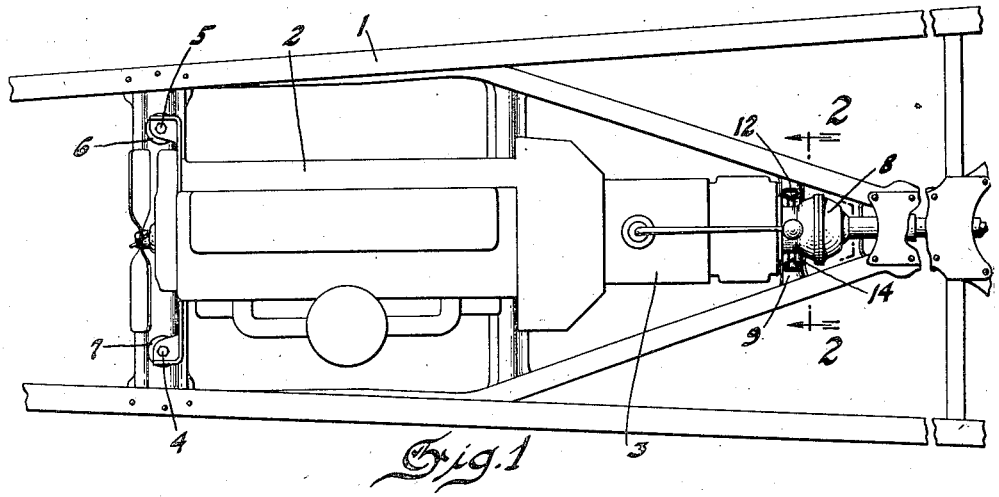
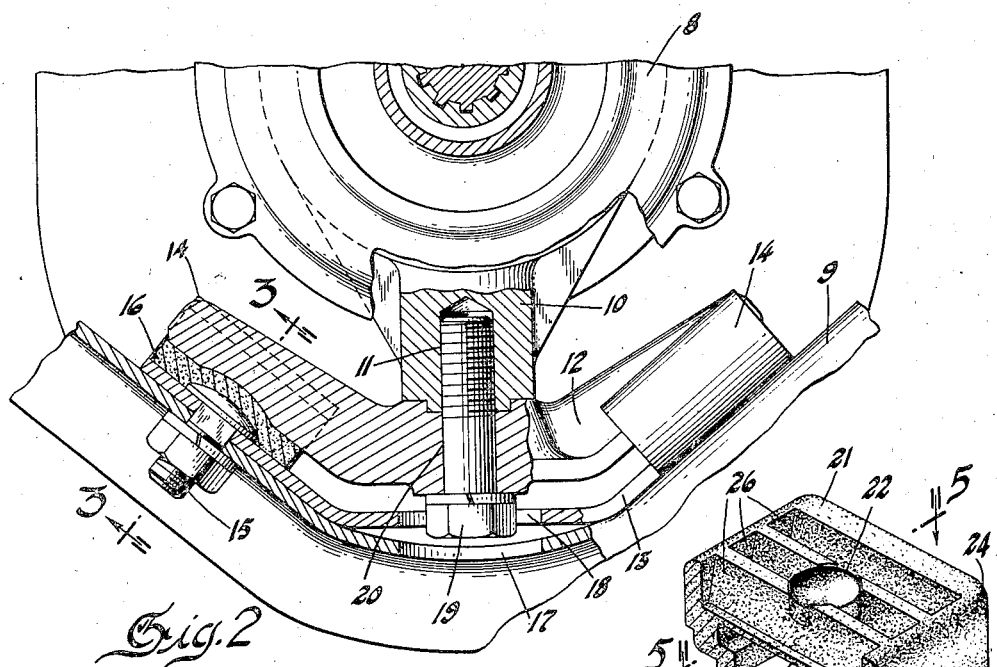
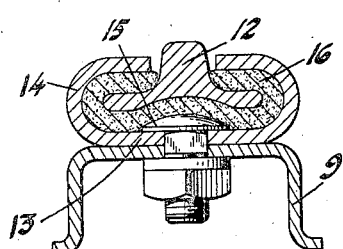
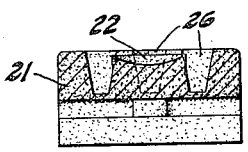
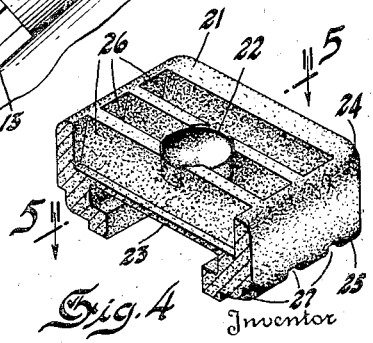
Inventor
John H. Keller
By Blackmore, Spencer & Flint
Attorneys Patented Apr. 28, 1936

2,039,007

UNITED STATES PATENT OFFICE 2,039,007

REAR ENGINE MOUNTING

John H. Keller, Pontiac, Mich., assignor to General Motors Corporation, Detroit, Mich., a corporation of Delaware Application June 6, 1934, Serial No. 729,202

9 Claims. (Cl. 248—7)

This invention relates to improvements in resilient mountings, being particularly intended to be used in supporting an internal combustion engine which has inherent vibration qualities within the frame of a motor vehicle.

As is well known an internal combustion engine sets up vibrations within itself due to the motion of the rotating parts and also to the torque twist of the driving action and in order to increase the quietness of operation and riding qualities of a motor vehicle, many different devices are in use to absorb these vibrations.

This last mentioned torque twist causes vibrations set up about an axis longitudinally of the motor which axis passes substantially through the universal housing and it should be noted that the plane of the supporting members at the location of the resilient pads is substantially tangential to a circle which uses the above mentioned axis as a center. In this way, my invention tends to eliminate these vibrations by causing a force to be applied toward the axis of longitudinal rotation.

The object of the present invention is, therefore, to provide a resilient mounting for the rear end of an internal combustion engine which is efficient in use, easy to manufacture, economical and makes the whole easier to assemble.

In the accompanying drawing:

Figure 1 is a top plan view of a motor mounted in a frame by the use of the present invention.

Figure 2 is a section taken on line 2—2 of Figure 1, looking in the direction of the arrows and showing a part broken away to show the connections.

Figure 3 is a cross section taken on line 3—3 of Figure 2.

Figure 4 shows inverted a modification of the resilient pad.

Figure 5 is a section taken on line 5—5 of Figure 4.

Referring to the drawing, I have shown in Figure 1 an ordinary internal combustion engine 2 supported by a frame 1 of a motor vehicle. The motor 2 is supported at the forward end at two points 4 and 5 on two thick rubber washers 6 and 7. To the rear of the motor is secured the transmission unit 3 and behind that the universal connection 8. The cross frame member 9 is U-shaped to go down underneath the universal housing. Integral with the universal housing is a portion 10 which projects downward. This portion 10 is bored and tapped as shown at 11. Two U-shaped members 12 and 13 of the same general configuration as the cross frame member comprise the main body of the rear support. The upper member 12 is a forging of an inverted T-shape in cross section, as best shown in Figure 3. The lower member, consisting of a stamping, while being of the same width as the upper throughout the central portion, has wide end portions 14 which are of sufficient width so that they may be bent up around the upper member and practically encase the ends thereof. Each of these wide end portions 14 is drilled for a bolt 15 by which this member is secured to the cross frame. Each of these portions 14 is completely covered with a pad 16 of resilient material, such as rubber, and this pad is firmly fixed by vulcanizing to the lower end portion after the bolt 15 is placed in the hole in the lower member, and also to the underside of the upper member 12.

When the wide portions 14 have been bent up around the upper member 12 and then down upon the same to secure the two together as a unit assembly there is a pad or thickness of the resilient material under an initial compression between the two at all points.

The cross frame 9 has a hole through it at the center as has the lower member 13 as shown at 17 and 18 respectively. Both of these holes are of sufficient size to enable the insertion of a bolt head and a wrench for tightening the bolt. The central portion of the upper member 12 is bored for the body of the bolt 19 as shown at 20. Lock washers are used with all bolts to insure tight connection.

To mount an engine by this unit, the lower member may first be bolted to the cross frame 9 by the bolts 15, and then the engine is lowered to bring the boss 10 over the member 12 for the insertion of the anchor bolt 19, or alternately the unit can be mounted on the engine assembly and fastened to the frame after the engine is dropped into the frame.

In Figure 4 is shown a preformed or moulded piece of resilient material 21, which may be used in place of pad 16, which has a depressed button 22 designed to fit over the head of bolt 15 and a T-shaped channel 23 adapted to fit around the member 12. The corners 24 and 25 are rounded to fit inside the rings 14 when they are bent around. The body has a series of transverse slots 26 and the edges have portions cut away as shown at 27, both of which tend to make the moulded piece more resilient.

It will therefore be seen that I have provided an efficient, durable and economic mounting for the rear of an internal combustion engine, in which at all points there is a thickness of resilient material between the frame and the motor.

I claim:

1. A resilient support for one end of an internal combustion engine comprising, two U-shaped metallic members, one above the other, the lower member having its end portions substantially wider than the central portion and resilient pads rigidly secured to the whole surface of said wide end portions, the upper member resting on the resilient pads, the free edges of the wide ends being bent up around and down upon the upper member so that the two members are separated at all points by resilient material.

2. A resilient support for one end of an internal combustion engine having a universal joint connection which is ultimately supported in a frame comprising, two U-shaped metallic members, one above the other, the lower having wider end portions than the upper, and resilient pads firmly secured to said wide end portions, the upper member resting upon said resilient pads, the free edges of the lower member being bent up around and down upon the upper member to secure the two together and yet keep them separated by resilient material throughout, means for securing the upper member to the universal housing and means to secure the lower member to the frame.

3. Means for resiliently mounting an internal combustion engine having a universal joint connection, the engine being inherently capable of setting up vibrations, including a main frame having a cross member U-shaped in a vertical plane, a metal member bolted to the top of the lower portion of the U-shaped cross member, a second metal member spaced from the first by a thickness of resilient material placed upon the extending ends of the first metal member, said ends being of sufficient width to be bent up around the second member and down upon the same to secure the two together, said resilient material being as wide as the ends so that when the latter are bent the first and second members will be separated by it, means for securing the second metallic member to the universal joint housing.

4. In a device of the class described, two U-shaped metallic members, the end portions of one being substantially wider than those of the other and bent up around the other to secure the two together, a piece of resilient material located between the two members throughout the point of bending so that the two are insulated from each other.

5. A resilient support for the rear end of an internal combustion engine having a universal housing which is ultimately supported in a frame comprising a single contact member projecting from the lower surface of the universal housing, a winged member secured at its center to this contact member, a second winged member secured to the first at its extremities, a resilient material spacing the two winged members at their points of securing so that the two are insulated one from the other, means securing this second winged member at its extremities to said frame.

6. A support for the rear end of an internal combustion engine having a universal housing which is ultimately supported in a frame comprising two U-shaped members resiliently connected together, one member being connected at its center to the lower portion of the universal housing by a bolt, the other member being connected at its extremities to the frame, said frame and other member both having an opening therein of sufficient size to allow the insertion of a wrench to tighten the above mentioned bolt.

7. A resilient support for the rear end of an internal combustion engine having a universal housing which is ultimately supported on a frame comprising two members of wing shape lying parallel to each other throughout their lengths but spaced apart at their central portion and connected together at their extremities the main plane of each wing extremity being substantially tangent to a circle with its center on an axis of rotation of the motor, resilient means between their connected extremities and means connecting one of said members to the universal housing and the other to the frame whereby the torque twist will be absorbed in shear in the resilient material.

8. A resilient support for the rear end of an internal combustion engine having a universal housing which is ultimately supported on a frame comprising two members of wing shape lying parallel to each other throughout their lengths but spaced apart at their central portion and connected together at their extremities the main plane of each wing extremity being substantially tangent to a circle with its center on an axis of rotation of the motor, resilient means between their connected extremities and means connecting the center of the upper member to the lower portion of the universal housing, and means connecting the extremities of the lower member to the frame whereby the torque twist will be absorbed in shear in the resilient material.

9. A resilient support for the rear end of an internal combustion engine having a universal housing which is ultimately supported on a frame comprising two members of substantially the same shape lying parallel to each other throughout their lengths but spaced apart at their central portion and connected together at their extremities, resilient means between their connected extremities, a cross frame bar of substantially the same shape as said members and lying parallel thereto, means connecting the extremities of the adjacent member to the bar at spaced points, and means connecting the central portion of the other member to the lower portion of the universal housing at one point only.

JOHN H. KELLER.